United States Patent [19]

Puthawala et al.

[11] 4,280,922
[45] Jul. 28, 1981

[54] METHOD AND APPARATUS FOR EMBEDDING RADIOACTIVE PULVERULENT ORGANIC WASTE IN A THERMOPLASTIC MASS

[75] Inventors: Anwer Puthawala, Buckenhof; Othmar Meichsner, Raunheim; Erich Marr, Walldorf, all of Fed. Rep. of Germany

[73] Assignee: Kraftwerk Union Aktiengesellschaft, Mülheim, Fed. Rep. of Germany

[21] Appl. No.: 18,228

[22] Filed: Mar. 7, 1979

[30] Foreign Application Priority Data

Mar. 8, 1978 [DE] Fed. Rep. of Germany ....... 2810089

[51] Int. Cl.³ .............................................. G21F 9/34
[52] U.S. Cl. .............................. 252/301.1 W; 264/0.5; 366/24; 366/75; 366/154; 425/203
[58] Field of Search ................ 252/301.1 W; 366/154, 366/24, 75; 106/235; 264/0.5; 425/203

[56] References Cited

U.S. PATENT DOCUMENTS

| | | | |
|---|---|---|---|
| 3,148,412 | 9/1964 | Spreevwers | 264/349 |
| 3,193,877 | 7/1965 | Edwards | 366/75 |
| 3,971,732 | 7/1976 | Meier | 252/301.1 W |
| 4,125,208 | 11/1978 | Beltermann | 425/203 |

FOREIGN PATENT DOCUMENTS

| | | | |
|---|---|---|---|
| 2655957 | 6/1978 | Fed. Rep. of Germany ... | 252/301.1 W |
| 1520681 | 4/1968 | France | 252/301.1 W |
| 2318487 | 2/1977 | France | |
| 45-36834 | 11/1970 | Japan | 366/75 |

*Primary Examiner*—Deborah L. Kyle
*Attorney, Agent, or Firm*—Herbert L. Lerner

[57] ABSTRACT

Method of removing radiant, pulverulent synthetic wastes which are mixed dry with a thermoplastic mass in a kneader and then delivered from a discharge opening of the kneader into a container capable of providing a final storage therefor, while gases and/or vapors are withdrawn from degassing domes of the kneader, which includes delivering fluidic dried wastes by mechanical movement through a metering tube into a degassing dome in the kneader disposed next to the discharge opening, and admitting scavenging gas into the metering tube at least temporarily in direction toward the kneader; and device for carrying out the foregoing method.

11 Claims, 4 Drawing Figures

METHOD AND APPARATUS FOR EMBEDDING RADIOACTIVE PULVERULENT ORGANIC WASTE IN A THERMOPLASTIC MASS

The invention relates to a method and device for removing radiant, pulverulent synthetic wastes and, more particularly such wastes which are mixed dry with a thermoplastic mass in a kneader and then delivered from a discharge opening of the kneader into a container capable of providing a final storage therefor, while gases and/or vapors are withdrawn from degassing domes of the kneader. Such synthetic wastes are, especially, filter materials which are introduced into nuclear facilities or installations for purifying radioactive liquids or gases and which can contain a varying fraction or portion of organic substance.

According to the heretofore known method of the German Published Non-Prosecuted Application DE-OS 25 31 584, an effort is made to prevent decomposition of the synthetic wastes when intermixed in bitumin by keeping the bitumin temperature as low as possible. Limits are set, in this case, however, because the viscosity of the bitumin sharply increases with reducing temperature so that the embedding and mixing operations are rendered more difficult. The gases produced during decomposition of the synthetic wastes can be withdrawn, in fact, by means of the degassing domes, which lie between the end of the kneader at which the latter is supplied or charged and the discharge opening, and are connected to a degassing device. They create an impermissible danger there, however, due to their explosibility and concentration.

It is accordingly an object of the invention to provide a method and device for removing radiant, pulverulent synthetic wastes wherein danger of decomposition and gas formation of the synthetic wastes is reduced without requiring the temperature of the bitumin to become undesirably low. Simultaneously, it is an object of the invention to provide such a method and device wherein a dangerous concentration of partly explosive gas in the degassing dome is prevented. In this regard, the dried filter residues are to be metered to the bitumin so that no blockages or obstructions occur.

With the foregoing and other objects in view, there is provided, in accordance with the invention, a method of removing radiant, pulverulent synthetic wastes which are mixed dry with a thermoplastic mass in a kneader and then delivered from a discharge opening of the kneader into a container capable of providing a final storage therefor, while gases and/or vapors are withdrawn from degassing domes of the kneader, which comprises delivering fluidic dried wastes by mechanical movement through a metering tube into a degassing dome in the kneader disposed next to the discharge opening, and admitting scavenging gas into the metering tube at least temporarily in direction toward the kneader.

Through this invention, the mixing time is considerably shortened and, accordingly, the thermal loading or stressing of the material being embedded is reduced because the transit time of the synthetic wastes is not provided any more by the movement of the wastes. through the entire kneader but rather only by the movement thereof through the short distance between the "last" degassing dome and the discharge opening of the kneader. In this manner, the mixing time can be shortened to one-third or even less. thus, the decomposition, which indeed, does not occur abruptly, is accordingly reduced. In this regard, due to the mechanical movement in the metering tube, the accuracy of the metering operation is improved so that it is actually possible to manage with such brief mixing times. Furthermore, due to the scavenging gas, the metering tube is kept free of contaminating vapors so that the removal of gases or vapors limited in essence to this degassing dome can effect no obstruction or blockage.

In accordance with another feature of the invention, the method comprises applying vibratory motion to the metering tube as the mechanical movement, and in accordance with further features of the invention, the vibratory motion is applied transversely to the longitudinal axis of the metering tube.

In accordance with an additional feature of the invention, the method comprises continuously admitting the scavenging gas into the metering tube in order to avoid the formation of clumps by the wastes. If necessary, by varying the amount of scavenging gas, obstructions in the metering tube can be removed. Besides, ordinary air as well as other gases can be introduced which, if need be, due to the content of inert components therein, can avoid danger of explosion even when disruptions occur in the feed of the scavenging air.

In accordance with yet another feature of the invention, the method includes periodically heating the metering tube which preferably projects vertically into the degassing dome, with steam. Thereby, all at once, a given heating of the tube is achieved which facilitates expulsion of condensation products and possible bitumin splashes or spray along the short path to the discharge opening. In accordance with yet a further feature, the steam is passed through the metering tube, and is admitted from the metering tube into the degassing dome for scavenging synthetic powders adhering therein. For this purpose, a steam-conducting jacket disposed around the metering tube is provided with suitable discharge or exhaust openings.

In accordance with yet an added feature of the invention, the method comprises mixing the wastes in a ratio of about 60:40 with bitumin which is at a temperature of from 110° to 150° C. and which is preferably distillation bitumin (B 15 or B 25).

In accordance with the device of the invention, there is provided a kneader for embedding radiant synthetic wastes in bitumin comprising a plurality of degassing domes and formed with a discharge opening, one of the degassing domes being located adjacent the discharge opening and having a metering tube displaceable with respect to the one degassing dome.

In accordance with another feature of the invention, the metering tube has a heating steam jacket.

In accordance with a further feature of the invention, the kneader includes nozzles disposed on the metering tube and extending from the steam jacket into the one degassing dome.

In accordance with an added feature of the invention, the kneader includes a vibrator disposed on the one degassing dome, the metering tube being connected to the vibrator.

In accordance with a concomitant feature of the invention, the kneader includes a scavenging-gas union provided on the metering tube.

Other features which are considered as characteristic for the invention are set forth in the appended claims.

Although the invention is illustrated and described herein as embodied in method and device for removing radiant, pulverulent synthetic wastes, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
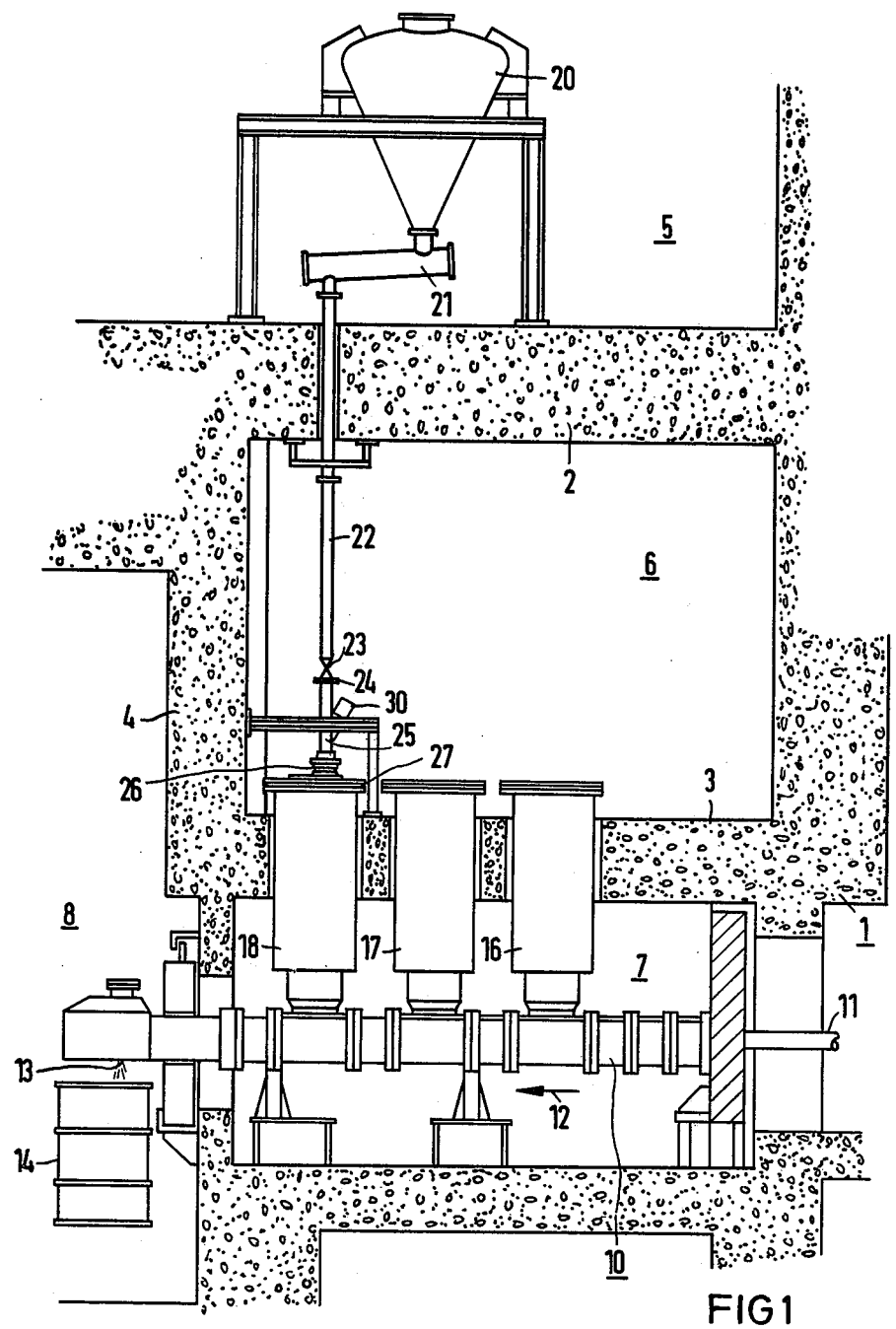
FIG. 1 is a diagrammatic side elevational view, partly in section, of a device in the form of a kneader for removing radiant, pulverulent synthetic wastes, in accordance with the invention, and lines with the radiant synthetic wastes leading thereto.

Referring now to the drawing and first, particularly, to FIG. 1 thereof, there are shown four chambers 5, 6, 7 and 8 separated from one another by intermediate walls or partitions 2, 3 and 4 in a concrete building 1, the chambers 5, 6, 7 and 8 serving as a drumming station for radiant synthetic wastes. Waste storage or drumming in a condition affording ultimate disposal is effected with the aid of a kneader 10 which is essentially disposed in the chamber 7. The kneader 10 is constructed, for example, as disclosed in U.S. Pat. No. 3,971,732. It has one or more worm shafts that are set in motion by a non-illustrated electric motor through a drive shaft 11. The worm shafts advance or convey the radiant wastes and bitumin employed as matrix or embedding material in direction of the arrow 12 through the kneader 10 to a discharge opening 13. The kneaded mixture is delivered thereat into socalled standard drums 14 having a 200 liter capacity which, after having been filled and closed, are transported to an ultimate storage facility, such as abandoned salt mines, for example.

The kneader 10 has three degassing domes 16, 17 and 18 serially disposed in direction toward the discharge opening 13 and serving for removal of gases or vapors, as is disclosed in the hereinaforementioned German Published Nonprosecuted Application DE-OS No. 25 31 584. The degassing domes 16, 17 and 18 have respective ends thereof facing away from the kneader 10 which extend into the chamber 6.

In the illustrated embodiment of the invention, the radiant wastes are accumulated in a rocking bin or bunker 20. These wastes are in essence dried residues from filters for purifying gas or liquid flows of a pressurized water reactor. The size of particles thereof is from about 1 to 300µ. The synthetic substance contained therein is primarily resins having a styrene base. In addition thereto, the residues include filtering aids or auxiliaries such as kieselguhr or diatomaceous or infusorial earth.

From the rocking bunker 20, the wastes can be conveyed by a conveyor tube 21 to a downcomer or gravity tube 22 which extends out of the chamber 5 through the wall or partition 2 into the chamber 6. A gate-type shut-off valve 23 is provided thereat which is connected by means of a flexible collar 24, preferably formed of rubber or rubber-like material, to a section of pipe 25. The pipe section 25 is the outer extension or elongation of a metering tube which is shown in greater detail in FIGS. 2 to 4. The pipe section 25 is sealed by means of a corrugated tube 26 with respect to a cover 27 of the vapor or steam dome 18 and is set into vibratory motion above all transversely to the longitudinal axis thereof by a vibrator 30. The vibration frequency may be 50 Hz at an amplitude of 0.7 mm.

Figure 2:
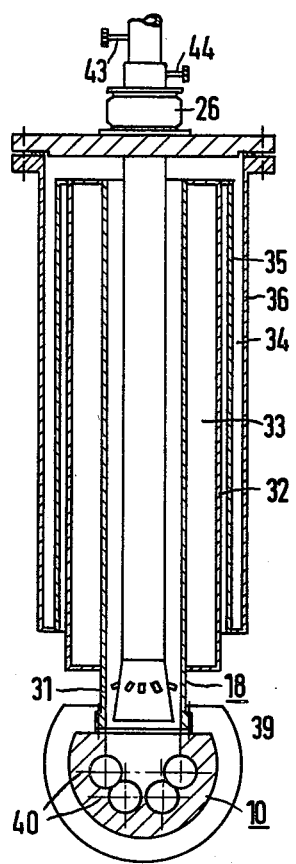
FIG. 2 is an enlarged fragmentary longitudinal sectional view of FIG. 1 taken along the line II—II and showing one of the degassing domes thereof for supplying the synthetic wastes.
Figure 3:
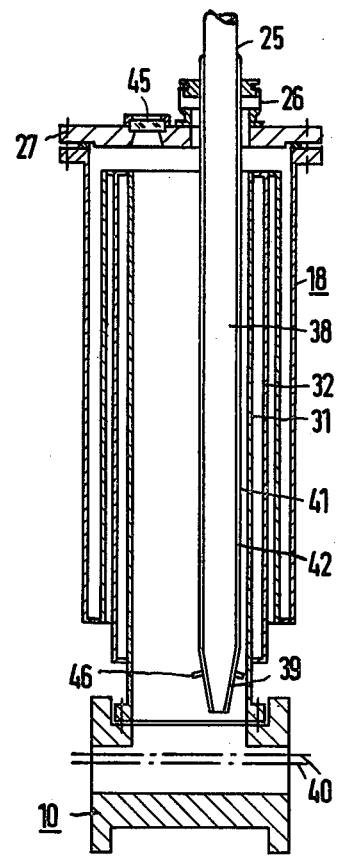
FIG. 3 is a longitudinal sectional view of FIG. 2 taken along the line III—III.
Figure 4:
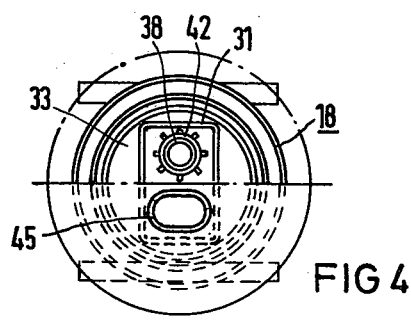
FIG. 4 is a cross-sectional view of FIG. 2 taken along the line IV—IV.

As is seen in FIGS. 2 to 4, the steam dome 18 seated on the kneader 10 constitutes a tube 31 having a rectangular cross section. The tube 31 is surrounded with clearance by a cylindrical tube 32, so that an annular or ring chamber 33 for receiving superheated steam therein is formed. Another annular or ring chamber 34 which is defined by concentric or coaxial tube sections 35 and 36, can contain a non-illustrated condenser therein.

A metering tube 38 having a wedge-shaped squeezed-together end 39 projects therewith, as an extension or elongation of the tube section 25, into the dome 18 up to the screws or worms of the kneader 10 which are indicated by center lines 40. The longitudinal direction of the wedge-shaped end 39 extends transversely to the longitudinal direction of the kneader worms 40, so that the entire width of the bitumin flow displaced by the worms 40 is covered.

The metering tube 38 is provided with an outer casing 41 so that an intermediate space 42 is defined therebetween which can receive steam therein. A union 43 for the supersaturated steam is shown in FIG. 2. At an oppositely disposed union location 44, scavenging air can be blown into the tube 38 and can flow therethrough to the kneader 10 and simultaneously ensure that the tube 38 is not wetted by condensing vapors and covered by dried-up bitumin splashes or by waste. In addition, the conveyance or delivery of the waste particles is improved.

At the cover 27 of the degassing dome 18, wherein the metering tube 38 is disposed, tightly sealed with the corrugated tube 26, a lead-glass window 45 is provided for observation, for example, by means of a television camera.

The supersaturated steam flows from the union 43 through the annular space 42 in direction toward the kneader 10. At the lower end 39 of the metering tube 38, the supersaturated steam discharges from nozzles 46. Thereby, clogging or obstructing of the lower region of the dome 18 with bitumin is prevented. Similar discharge openings can also be distributed over the height or length of the metering tube 38.

We claim:

1. Method of embedding dry radioactive, pulverulent wastes containing an organic substance in a thermoplastic mass in a kneader of the pass through type said kneader having a plurality of degassing domes disposed along its length in which the thermoplastic mass is introduced through an inlet near one end of the kneader and is delivered through a discharge opening near the other end of the kneader into a container capable of providing a final storage therefor, while gases and/or vapors are withdrawn from the degassing domes of the kneader, further including the combination therewith of delivering fluidic dried wastes to the kneader through a metering tube subjected to mechanical movement to facilitate passage of the wastes, said metering tube extending into the degassing dome in the kneader disposed next to the discharge opening, and admitting scavenging gas into the metering tube at least temporarily in direction toward the kneader.

2. Method according to claim 1 which further comprises applying vibratory motion to the metering tube as the mechanical movement.

3. Method according to claim 2 wherein the vibratory motion is applied transversely to the longitudinal axis of the metering tube.

4. Method according to claim 1 which further comprises continuously admitting the scavenging gas into the metering tube.

5. Method according to claim 1 which further comprises heating the metering tube with steam.

6. Method according to claim 5 wherein the steam is passed through the metering tube, and admitting the steam from the metering tube into the degassing dome.

7. Method according to claim 1 which further comprises mixing the wastes in a ratio of about 60:40 with bitumin at 110° to 150° C.

8. Kneader for embedding radioactive pulverulent wastes in bitumen comprising a kneader of the pass through screw type having a plurality of degassing domes disposed along its length and with an inlet near one end of the kneader for the introduction of bitumen and with a discharge opening near the other end, one of said degassing domes being located adjacent said discharge opening, a metering tube through which said wastes pass into the kneader, extending into said one degassing dome, means to apply mechanical movement to the metering tube to facilitate passage of said wastes therethrough, and gas inlet means for the admission of scavenger gas to said metering tube in direction of the kneader.

9. Kneader according to claim 8 wherein said metering tube has a heating steam jacket.

10. Kneader according to claim 9 including nozzles disposed on said metering tube and extending from said steam jacket into said one degassing dome.

11. Kneader according to claim 8 including a vibrator disposed on said one degassing dome, said metering tube being connected to said vibrator.

* * * * *